A. SHARP.
SPHERICAL BEARING FOR SHAFTS.
APPLICATION FILED NOV. 22, 1916.
1,288,707.
Patented Dec. 24, 1918.
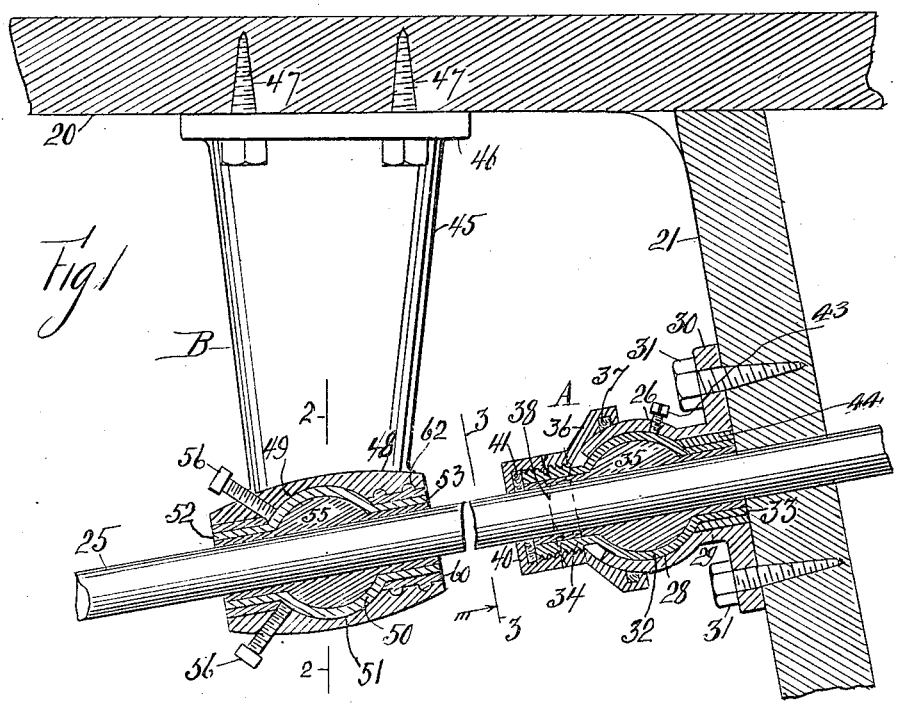
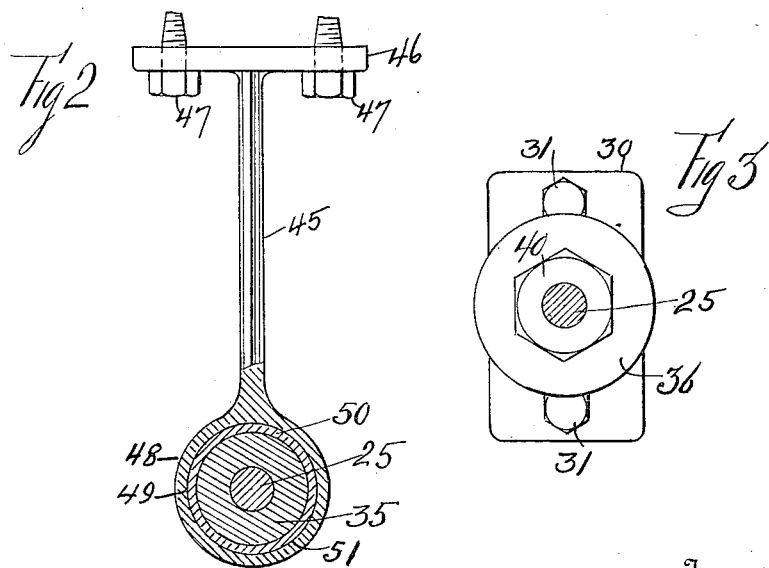
Inventor
Albert Sharp
By his Attorney

UNITED STATES PATENT OFFICE.

ALBERT SHARP, OF BAYONNE, NEW JERSEY.

SPHERICAL BEARING FOR SHAFTS.

1,288,707.  Specification of Letters Patent.  Patented Dec. 24, 1918.

Application filed November 22, 1916. Serial No. 132,776.

*To all whom it may concern:*

Be it known that I, ALBERT SHARP, a citizen of the United States, and a resident of Bayonne, in the county of Hudson and State of New Jersey, have invented certain new and useful Improvements in Spherical Bearings for Shafts, of which the following is a specification.

This invention relates to spherical bearings for shafts. Its essential characteristics comprise a spherical seat of one continuous piece of material which supports the spherical bearing that is made of one continuous piece of material.

In the drawings Figure 1 shows an elevation and part longitudinal section of a pair of improved bearings applied to the propeller shaft of a boat; Fig. 2 represents a part left hand side view and section of Fig. 1 on the line 2, 2 and Fig. 3 is a section of Fig. 1 on the line 3, 3 and left hand view of Fig. 1 viewed in the direction of the arrow.

The rear portion of a boat is indicated at 20 with the stern post 21. A stern bearing indicated in its entirety by the letter A extends from the stern post 21, and a strut bearing indicated in its entirety by the letter B, extends from the rear portion 20. A propeller shaft 25 is supported in the stern bearing A and in the strut bearing B.

The stern bearing A comprises a housing 26 with the spherical seat 28 and has extending therefrom the neck 29 with the flange 30. Screws 31 secure the flange 30 to the stern post. A hollow spherical bearing 32 has extending from one end the sleeve 33 and from the other end extends the threaded sleeve 34. Babbitt metal 35 is located in the spherical cavity of the bearing 32 and in the sleeves 33 and 34 and is bored for the shaft 25. A cap 36 with the annular packing 37 encircles the bearing 26 and is in threaded engagement with sleeve 34. One end of the cap 36 is in threaded engagement with the threaded sleeve 34 and its outer surface is made hexagonal as indicated at 38. A cap nut 40 with the packing 41 is in threaded engagement with the sleeve 34 and forms a stuffing box therewith.

A set screw 43 is in threaded engagement with the housing 26 and clamps the bearing 32 to hold the latter in place and maintain it in proper alinement and Babbitt metal 44 may be used for the same purpose.

It will be noted that the bearing 32 is made of one piece of material and that the seat 28 of the housing 26 extends to opposite sides of a plane perpendicular to the axis of the shaft 25 and passing through the central portion of the bearing 32.

The strut bearing B comprises the leg 45 with the flange 46 having openings for the screws 47 that secure said flange to the rear portion 20. With the leg 45 is formed the housing 48 having the spherical seat 49. A hollow spherical bearing is indicated at 50 with the spherical seat 51 and the sleeves 52 and 53. The bearing 50 with its sleeves are all made of one piece of material. Babbitt metal 55 is located in the spherical cavity of the bearing 50 and in the sleeves 52 and 53. The bearing 50 may be held in place by set screws 56 which are in threaded engagement with the threaded housing 48 and Babbitt metal 60 may be poured in the annular spaces between the housing 48 and the sleeves 52 and 53. Grooves 62 may be formed in the housing 48 to hold the said Babbitt metal. The Babbitt metal 60 constitutes locking sleeves to maintain the bearing 50 in proper alinement. The housing 48 extends on opposite sides of a plane perpendicular to shaft 25 and passing through the middle or central portion of the bearing 50. The Babbitt metal 55 is bored for the shaft 25.

To locate the bearing 50 with its spherical seat 51 in place in the housing 48, the said bearing is first cast in the ordinary manner, after which its outer surface is coated with tar oil. The housing 48 is then cast around the bearing 50 and the molten metal of the housing is prevented from melting or in any way injuring the bearing 50 by reason of the said coating of tar oil. The stern bearing A is made in a similar manner. The spherical bearing 32 is first cast in the ordinary manner after which its outer surface is coated with tar oil and then the housing 26 is cast around said bearing 32.

One of the important advantages of the invention consists in a solid housing of one piece of material surrounding a spherical bearing and by reason thereof the bearing can not become disengaged from the housing.

Having described my invention what I desire to secure by Letters Patent and claim is:—

1. The combination of a spherical bearing having an axial opening to support a shaft, a housing of one piece of material with a spherical seat for said bearing and means to hold the bearing in proper operative position longitudinally and transversally.

2. The combination of a leg, a housing with a spherical seat formed with said leg, a spherical bearing with sleeves at its opposite ends supported on the spherical seat of the housing, a shaft supported in the bearing and Babbitt metal between the said sleeves and the bore of the housing.

3. The combination of a leg, a housing with a spherical seat formed with said leg, a spherical bearing with sleeves at its opposite ends supported on the spherical seat of the housing, Babbitt metal in the spherical bearing forming a support for a shaft extending therethrough and locking means between the housing and the bearing to hold the latter longitudinally and transversally.

4. The combination of a housing of one piece of material and having a spherical seat, a spherical bearing with sleeves at each end supported in said housing, one of said sleeves having a thread formed therewith, a cap with an annular packing and threaded at one end surrounding said housing and its threaded end in engagement with the threaded sleeve of the bearing, a cap nut with a packing in engagement with the threaded sleeve of the bearing and means to hold the bearing in proper position longitudinally and transversally.

Signed at the borough of Manhattan, city of New York, in the county of New York and State of New York, this 16th day of November, A. D. 1916.

ALBERT SHARP.

Witnesses:
A. A. DE BONNEVILLE,
A. W. BAKER.

Copies of this patent may be obtained for five cents each, by addressing the "Commissioner of Patents, Washington, D. C."